United States Patent
Liu et al.

(10) Patent No.: US 10,700,533 B2
(45) Date of Patent: Jun. 30, 2020

(54) CONTROL DEVICE AND CONTROL METHOD FOR EQUALLY CHARGING AND DISCHARGING BATTERY UNITS

(71) Applicant: Stone Energy Technology Corporation, New Taipei (TW)

(72) Inventors: Chin-Chuan Liu, Kaohsiung (TW); Li-Ho Yao, Taipei (TW)

(73) Assignee: STONE ENERGY TECHNOLOGY CORPORATION, New Taipei (TW)

( * ) Notice: Subject to any disclaimer, the term of this patent is extended or adjusted under 35 U.S.C. 154(b) by 352 days.

(21) Appl. No.: 15/587,813

(22) Filed: May 5, 2017

(65) Prior Publication Data

US 2018/0131198 A1 May 10, 2018

(30) Foreign Application Priority Data

Nov. 8, 2016 (TW) .............................. 105136189 A

(51) Int. Cl.
*H02J 7/00* (2006.01)

(52) U.S. Cl.
CPC .......... *H02J 7/0019* (2013.01); *H02J 7/0018* (2013.01); *H02J 7/0021* (2013.01)

(58) Field of Classification Search
None
See application file for complete search history.

(56) References Cited

U.S. PATENT DOCUMENTS

| 2005/0083014 A1* | 4/2005 | Baumgartner | H02J 7/0008 |
| | | | 320/116 |
| 2010/0007308 A1* | 1/2010 | Lee | H02J 7/0018 |
| | | | 320/118 |
| 2011/0057617 A1* | 3/2011 | Finberg | H02J 7/0016 |
| | | | 320/118 |
| 2013/0328530 A1* | 12/2013 | Beaston | H01M 10/4207 |
| | | | 320/128 |

FOREIGN PATENT DOCUMENTS

| CN | 102545332 A | 7/2012 |
| JP | 2009178040 | 8/2009 |
| TW | I404963 B1 | 8/2011 |
| TW | I398660 B1 | 6/2013 |
| TW | 201409897 A | 3/2014 |

* cited by examiner

Primary Examiner — David V Henze-Gongola
(74) Attorney, Agent, or Firm — Thomas J. Nikolai; DeWitt LLP

(57) ABSTRACT

A control device and a control method for equally charging and discharging battery units may prolong life of the battery units of the control device. The control method includes steps of: detecting the battery units to generate measuring parameters; calculating determining parameters; calculating an average value of the determining parameters; selecting one of the battery units according to an operating status of the battery units; calculating a setting parameter; setting a pause time; charging or discharging the selected battery unit after stopping charging or discharging the selected battery unit for the pause time. When the battery units are charged or discharged, an overcharged or over-discharged battery (Continued)

unit may be selected. The selected battery unit may be stopped charging or discharging for the pause time. Therefore, life of the battery units may be prolonged.

12 Claims, 8 Drawing Sheets

CONTROL DEVICE AND CONTROL METHOD FOR EQUALLY CHARGING AND DISCHARGING BATTERY UNITS

CROSS-REFERENCE TO RELATED APPLICATIONS

This application claims the priority benefit of TW application serial No. 105136189, filed on Nov. 8, 2016. The entirety of the above-mentioned patent application is hereby incorporated by reference herein and made a part of specification.

BACKGROUND OF THE INVENTION

1. Field of the Invention

The present invention relates to a control device and a control method, and particularly to a control device and a control method for equally charging and discharging battery units.

2. Description of the Related Art

With the increasing awareness in environmental protection, the automobile system has used electricity power as a power source for many years. An electricity power supply device of the automobile system may consist of multiple battery modules, and may provide electricity power to the automobile system.

The battery modules of the electricity power supply device may be electronically connected in parallel or in series through a connecting device. Therefore, performance of the electricity power supply device may correspond to conductive quality of the connecting device. The conductive quality of the connecting device corresponds to material of the connecting device, and further corresponds to connecting strength between the connecting device and the battery modules.

For example, screws may be screwed into the connecting device and the battery modules, and the connecting device may be electronically connected to the battery modules. When the screws are tightly screwed into the connecting device and the battery modules, contact area of the connecting device and the battery modules may be greater, and therefore, impedance between the connecting device and the battery modules may be smaller. Further, an area that the connecting device contacts with air may be smaller, and oxidation of electrodes of the battery modules may be more difficult. Then, the impedance between the connecting device and the battery modules may not be increased, and an impedance of the electricity power supply device may be stabilized. Therefore, the electricity power supply device may stably provide the electricity power to the automobile system, and elements of the automobile system may not be decreased by unstable electricity power.

The electricity power supply is mounted on the automobile system, and a driver of the automobile system may drive the automobile system on the road. When the road is rugged, the electricity power supply may be quaked with the automobile system driving on the rugged road. Therefore, connection strength between the connecting device and the battery modules may be decreased, and the impedance of the electricity power supply device may be unstable. Further, the electricity power supply may be overcharged or over-discharged. When a user detects the connection between the connecting device and the battery modules to determine the connection strength, the automobile system must not be used, so as to avoid that the user gets an electric shock.

A battery detecting module may detect the battery modules to determine charging states of the battery modules. As shown in TW patent No. I398660, the application discloses a detecting device and a detecting method for monitoring battery module. The detecting method comprises steps of: detecting the battery module to determine voltages of contacts of the battery module by a voltage detecting module; detecting the battery module to determine a current of the battery module when the battery module is discharged by a current transformer; and calculating impedances of connecting lines of the battery module to determine states of the connecting lines. When the connecting lines are oxidized or the connecting lines are loose from the contacts of the battery module, the impedances of the connecting lines may increase. Then the increased impedances of the connecting lines may be determined, and a user may send the battery module to a repair store to fix the battery module.

Further, quality of the battery module corresponds to internal resistances of rechargeable batteries of the battery module. As shown in an application of TW patent No. I404963, the application discloses a method for determining battery module status. The battery module comprises multiple battery units connected to a load. The method for determining battery module status comprises steps of: measuring open circuit voltages of the battery units, close circuit voltage of the battery units, and a load current of the load, and calculating an internal resistance of the battery units. Therefore, the battery module status may be determined according to the internal resistances of the battery units.

The connection strength between the connecting device and the battery modules may be detected when the driver is driving the automobile system. Therefore, the connection strength may not be detected immediately when the automobile system is driven.

The detecting method for monitoring battery module and the method for determining battery module status are determining physical states of the battery module or the battery units, such as the impedances of the connecting lines and the internal resistance of the battery units. Then a maintenance staff may determine health status of the battery module or remaining power of the battery module. However, there is no method to improve charging or discharging processes of the battery module.

The battery module is consisted of the battery units. When the battery module is charged or discharged, remaining power of each battery unit may not be equal. Therefore, when the battery module is charged or discharged, some of the battery units may be overcharged or over-discharged. Life of the overcharged or discharged battery units may be shortened, and life span of the battery module may be affected. Therefore, the battery module needs to be improved.

SUMMARY OF THE INVENTION

An objective of the present invention is to provide a control device and a control method for equally charging and discharging battery units. The control method may equally charge and discharge battery units to avoid over charging or over discharging the battery units.

To achieve the foregoing objective, the control method comprises steps of:

detecting the battery units to generate measuring parameters of the battery units respectively;

calculating determining parameters of the battery units according to the measuring parameters of the battery units respectively;

calculating an average value of the determining parameters of the battery units;

selecting one of the battery units according to an operating status of the battery units; wherein the operating status is a charging status or a discharging status;

calculating a setting parameter according to the determining parameter of the selected battery unit and the average value of the determining parameters;

setting a pause time according to the setting parameter;

stopping charging or discharging the selected battery unit during the pause time; and charging or discharging the selected battery unit after the pause time.

The control device comprises a positive electrode, a negative electrode, a plurality of battery units, and a controlling module.

The battery units are electronically connected between the positive electrode and the negative electrode. Each of the battery units comprises a battery and a first switch electronically connected in series.

The controlling module is electronically connected to the first switches and the batteries. The controlling module respectively detects the battery units to generate measuring parameters of the battery units, respectively calculates determining parameters of the battery units according to the measuring parameters of the battery units, and calculates an average value of the determining parameters of the battery units.

The controlling module further selects one of the battery units according to the operating status of the battery units, calculates a setting parameter according to the determining parameter of the selected battery unit and the average value of the determining parameters, sets a pause time according to the setting parameter, turns off the first switch of the selected battery unit during the pause time, and turns on the first switch of the selected battery unit after the pause time. The operating status is a charging status or a discharging status.

When the battery units are charged or discharged, the controlling module may select an overcharged or over-discharged battery unit. The controlling module may further turn off the first switch of the selected battery unit during the pause time to stop charging or discharging the overcharged or over-discharged battery unit. Therefore, life of the battery units may be prolonged.

Other objectives, advantages and novel features of the invention will become more apparent from the following detailed description when taken in conjunction with the accompanying drawings.

DETAILED DESCRIPTION OF THE INVENTION

Figure 1:
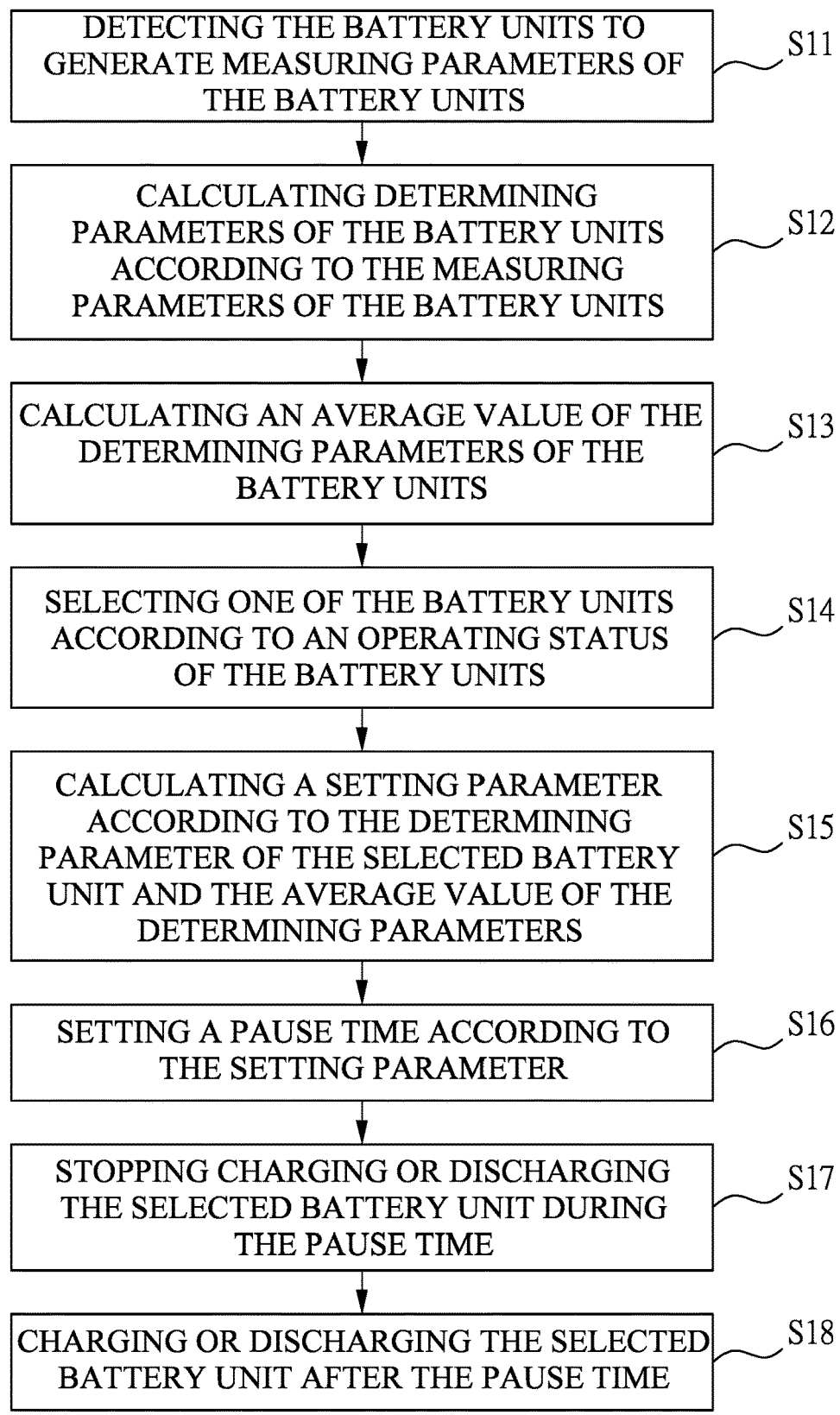
FIG. 1 is a flowchart of a control method for equally charging and discharging battery units.

With reference to FIG. 1, the present invention is a control device and a control method for equally charging and discharging battery units. The control method may equally charge and discharge the battery units to avoid over charging or over discharging the battery units. The control method comprises steps of:

detecting the battery units to generate measuring parameters of the battery units respectively (S11);

calculating determining parameters of the battery units according to the measuring parameters of the battery units respectively (S12);

calculating an average value of the determining parameters of the battery units (S13);

selecting one of the battery units according to an operating status of the battery units (S14), wherein the operating status is a charging status or a discharging status;

calculating a setting parameter according to the determining parameter of the selected battery unit and the average value of the determining parameters (S15);

setting a pause time according to the setting parameter (S16);

stopping charging or discharging the selected battery unit during the pause time (S17); and charging or discharging the selected battery unit after the pause time (S18).

When the battery units are charged or discharged, an overcharged or over-discharged battery unit may be selected. The selected battery unit may be stopped charging or discharging during the pause time. Therefore, life of the battery units may be prolonged.

The control method may further comprise a step of presetting a multiplying parameter. In the step of setting a pause time according to the setting parameter (S16), the pause time is calculated by the following equation:

$$T_{off} = K \times s;$$

$T_{off}$ is the pause time, K is the setting parameter, and s is the multiplying parameter. A time unit of the pause time is a second.

Figure 2:
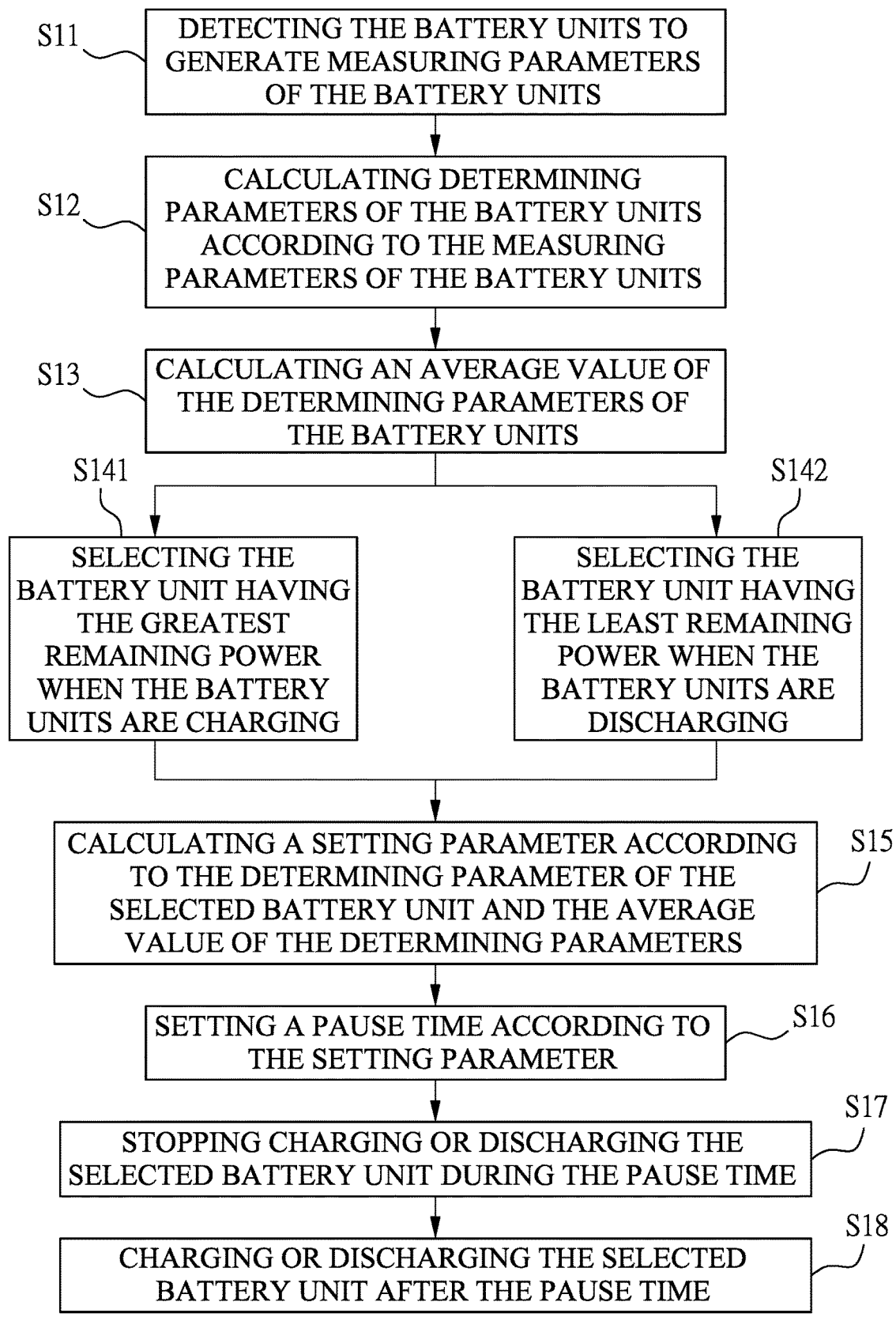
FIG. 2 is a flowchart of a first embodiment of the control method of FIG. 1.

With reference to FIG. 2, a first embodiment of the control method is shown. In the step of selecting one of the battery units according to operating status of the battery units (S14), selecting the battery unit having the greatest remaining power when the battery units are charged (S141), or selecting the battery unit having the least remaining power when the battery units are discharged (S142).

Figure 3:
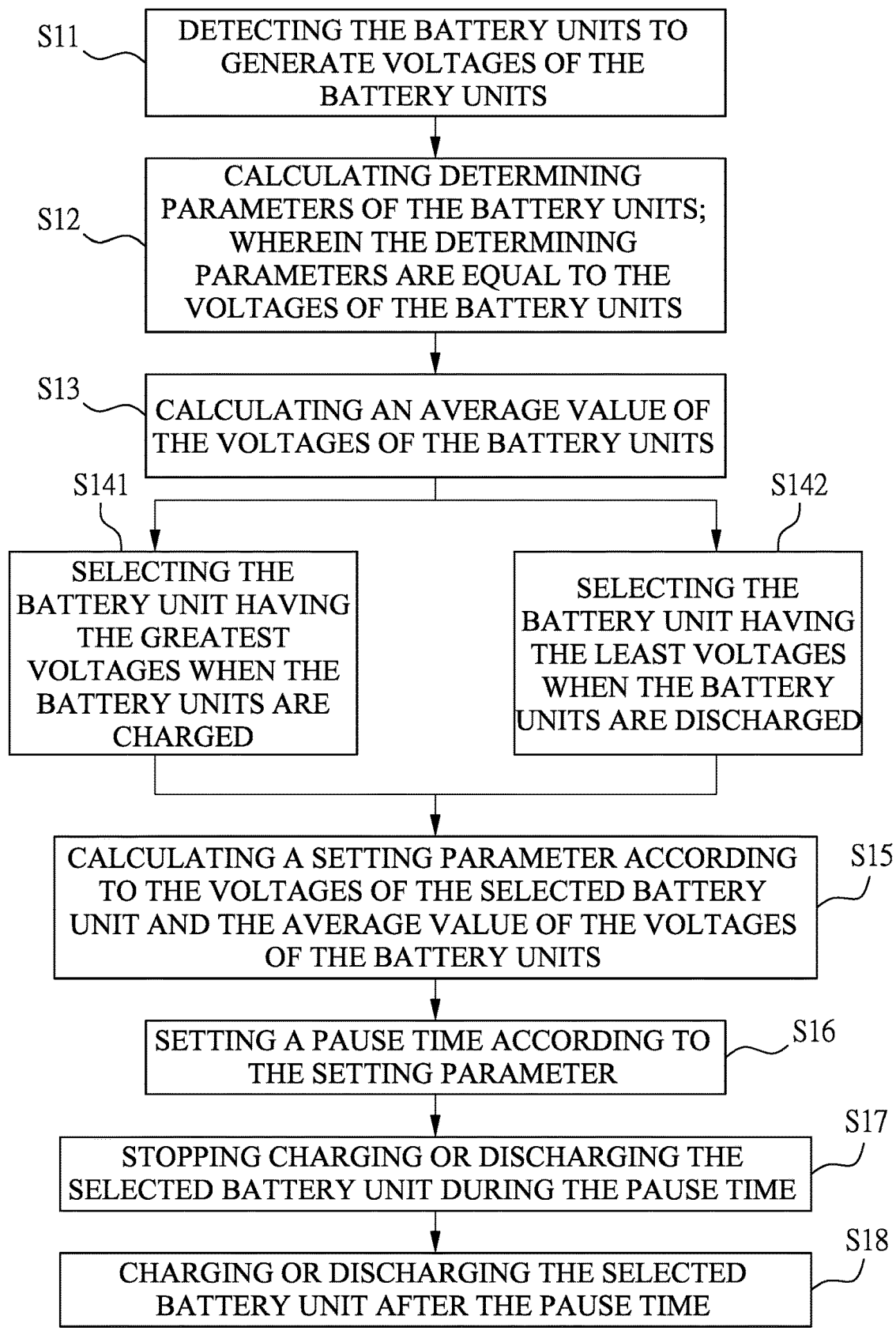
FIG. 3 is a flowchart of the second embodiment of the control method of FIG. 1.

With reference to FIG. 3, a second embodiment of the control method is shown. Since the remaining power of the battery unit is corresponding to a voltage of the battery unit, the more remaining power the battery unit has, the greater voltage the battery unit has. Therefore, in the second embodiment, the measuring parameters of the battery units are the voltages of the battery units, and the determining parameters of the battery units are equal to the measuring parameters of the battery units.

Therefore, in the step of selecting the battery unit having the greatest remaining power when the battery units are charged (S141), the battery having the greatest voltage is selected. In the step of selecting the battery unit having the least remaining power when the battery units are discharged (S142), the battery having the least voltage is selected.

In the second embodiment, the average value of the determining parameters is calculated by the following equation:

$$V_{avg} = \frac{V_1 + V_2 + \ldots + V_n}{n};$$

$V_{avg}$ is the average value, $V_1$-$V_n$ are the voltages of the battery units, and n is a number of the battery units.

When the battery units are charged, the setting parameter is calculated by the following equation:

$$K = \left|\frac{(V_{max} - V_{avg}) \times 100}{V_{avg}}\right|;$$

K is the setting parameter and is a positive integer, $V_{max}$ is the voltage of the battery unit having the greatest remaining power, and $V_{avg}$ is the average value.

When the battery units are discharged, the setting parameter is calculated by the following equation:

$$K = \left|\frac{(V_{avg} - V_{min}) \times 100}{V_{avg}}\right|;$$

K is the setting parameter and is a positive integer, $V_{min}$ is the voltage of the battery unit having the least remaining power, and $V_{avg}$ is the average value.

Figure 4:
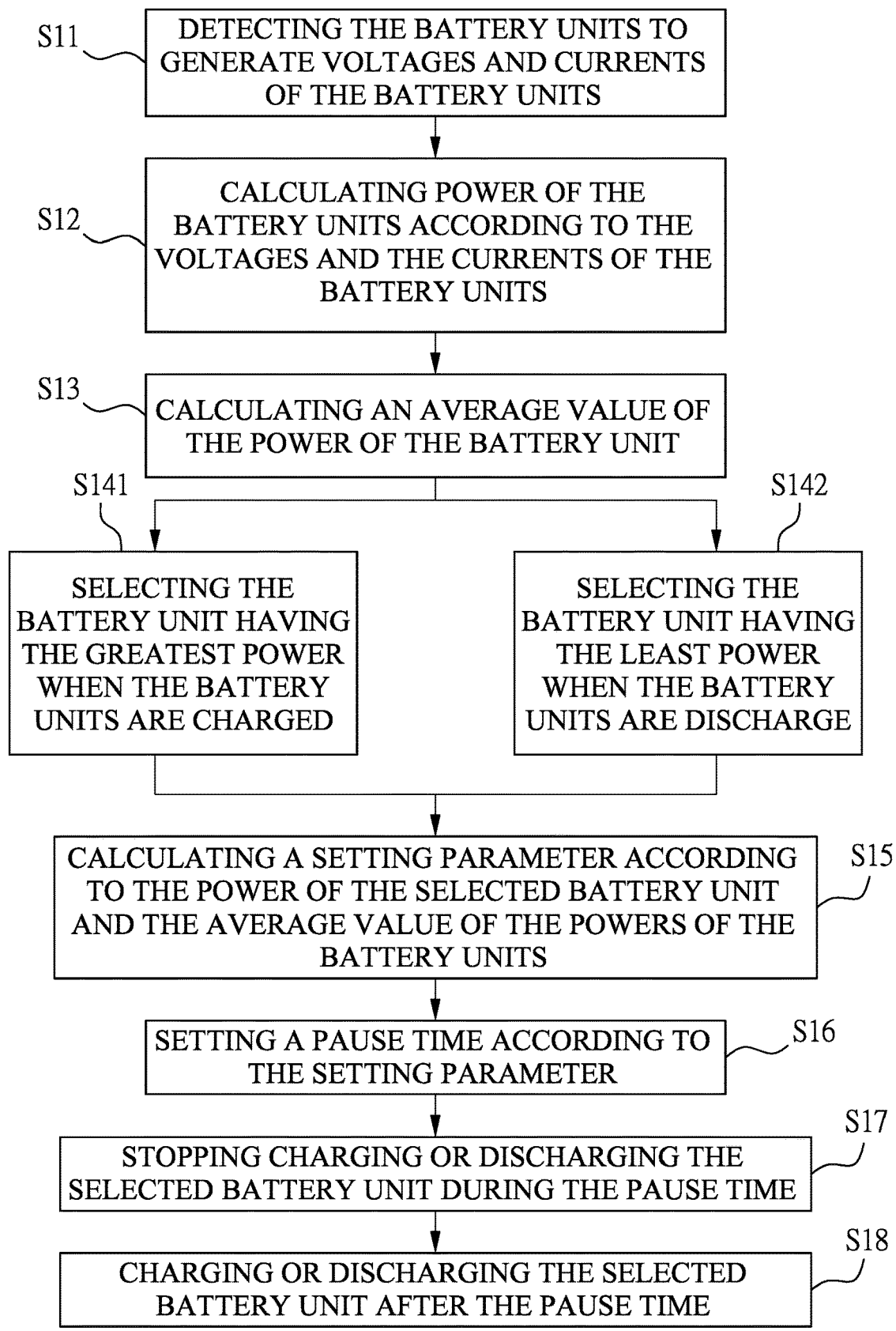
FIG. 4 is a flowchart of the third embodiment of the control method of FIG. 1.

With reference to FIG. 4, a third embodiment of the control method is shown. Since the remaining power of the battery unit is corresponding to a power of the battery unit, the more remaining power the battery unit has, the greater power the battery unit has. Therefore, in the third embodiment, the measuring parameters of the battery units are the voltages of the battery units and currents of the battery units. The determining parameters of the battery units are the powers of the battery units. The determining parameters are calculated by the following equation:

$$W_1 = V_1 \times I_1; W_2 = V_2 \times I_2; \ldots W_n = V_n \times I_n;$$

$W_1$-$W_n$ represent the powers of the battery units which are the determining parameters of the battery units, $V_1$-$V_n$ represent the voltages of the battery units, $I_1$-$I_n$ represent the currents of the battery units, and n is the number of the battery units Therefore, in the step of selecting the battery unit having the greatest remaining power when the battery units are charged (S141), the battery having the greatest power is selected. In the step of selecting the battery unit having the least remaining power when the battery units are discharged (S142), the battery having the least power is selected.

In the third embodiment, the average value of the determining parameters is calculated by the following equation:

$$W_{avg} = \frac{W_1 + W_2 + \ldots + W_n}{n};$$

$W_{avg}$ is the average value, $W_1$-$W_n$ represent the powers of the battery units which are the determining parameters of the battery units, and n is the number of the battery units.

When the battery units are charged, the setting parameter is calculated by the following equation:

$$K = \left|\frac{(W_{max} - W_{avg}) \times 100}{W_{avg}}\right|;$$

K is the setting parameter and is a positive integer, $W_{max}$ is the power of the battery unit having the greatest remaining power, and $W_{avg}$ is the average value.

When the battery units are discharged, the setting parameter is calculated by the following equation:

$$K = \left|\frac{(W_{avg} - W_{min}) \times 100}{W_{avg}}\right|;$$

K is the setting parameter and is a positive integer, $W_{min}$ is the power of the battery unit having the least remaining power, and $W_{avg}$ is the average value.

Figure 5A:
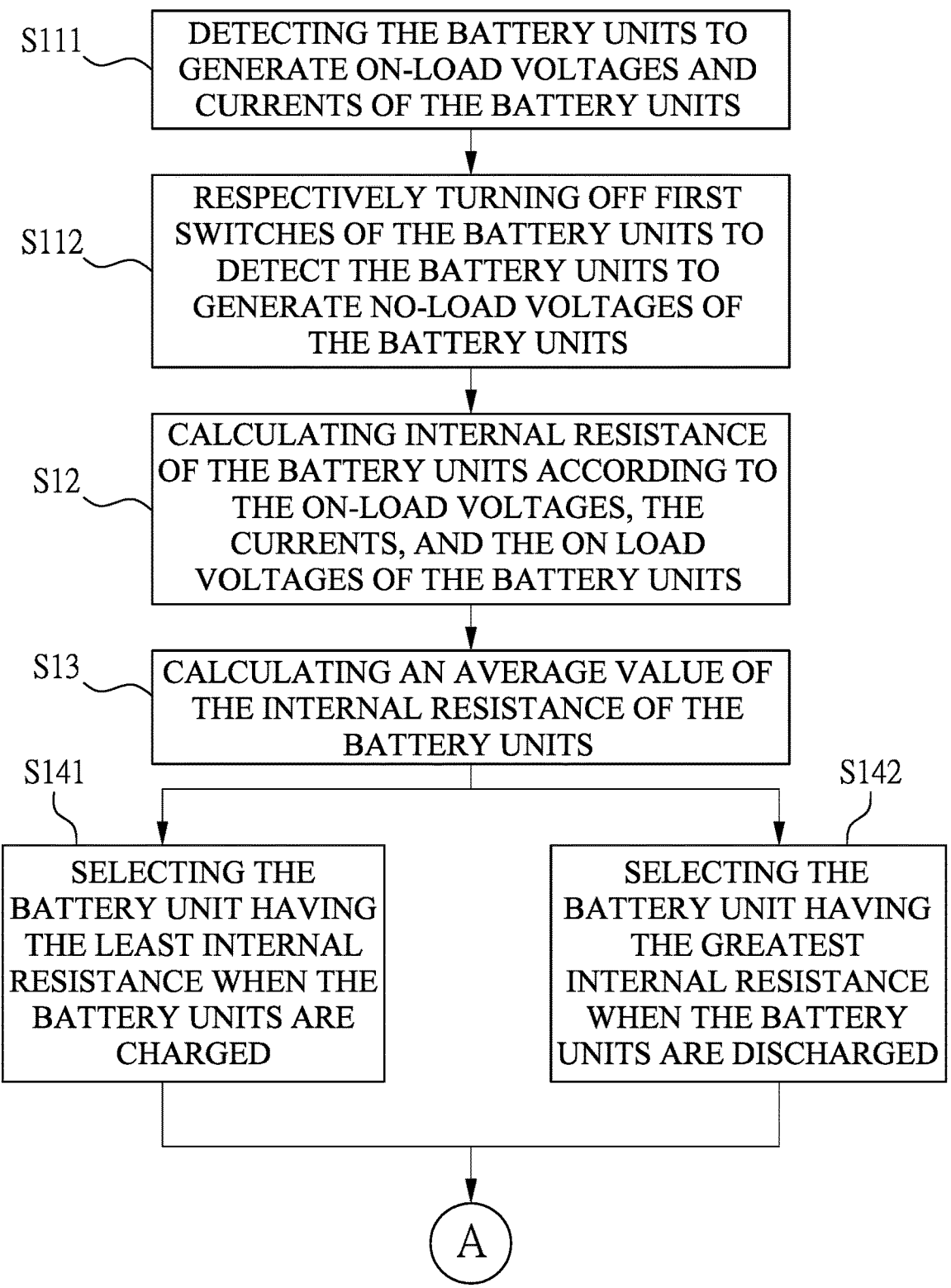
FIGS. 5A and 5B are flowcharts of the fourth embodiment of the control method of FIG. 1.
Figure 5B:
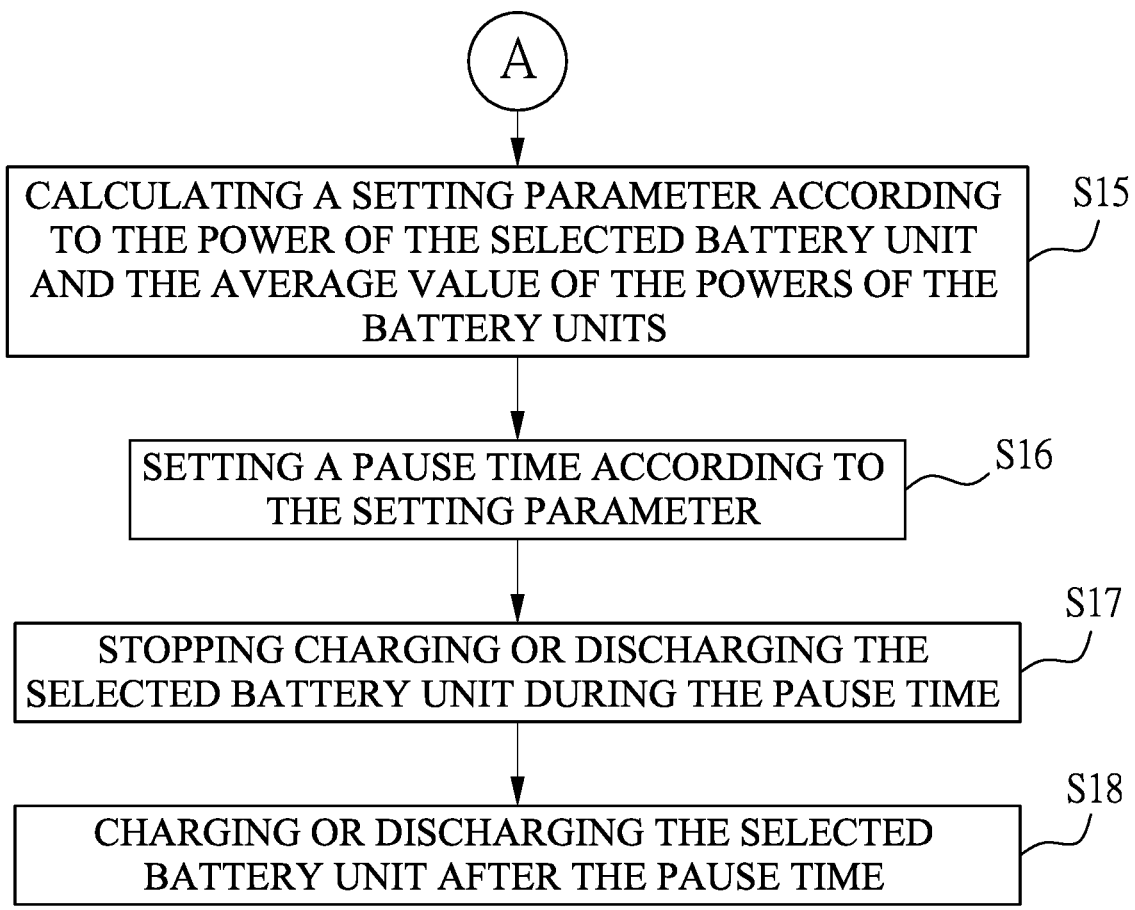

With reference to FIGS. 5A and 5B, a fourth embodiment of the control method is shown. Since the remaining power of the battery unit is corresponding to an internal resistance of the battery unit, the more remaining power the battery unit has, the lesser internal resistance the battery unit has. Therefore, in the fourth embodiment, the measuring parameters of the battery units are the voltages of the battery units and currents of the battery units. The determining parameters of the battery units are the internal resistances of the battery units.

In the step of detecting the battery units to generate measuring parameters of the battery units respectively (S11), the control method further includes the steps of:

detecting the battery units to generate on-load voltages and currents of the battery units (S111);

respectively turning off first switches of the battery units to detect the battery units to generate no-load voltages of the battery units (S112); wherein the measuring parameters are the on-load voltages, the currents, and the no-load voltages of the battery units.

In the fourth embodiment, the determining parameters are calculated by the following equation:

$$R_1 = \frac{V_1' - V_1}{I_1}; R_2 = \frac{V_2' - V_2}{I_2}; \ldots R_n = \frac{V_n' - V_n}{I_n};$$

$R_1$-$R_n$ represent the internal resistances of the battery units which are the determining parameters of the battery units, $V_1$-$V_n$ represent the on-load voltages of the battery units, $I_1$-$I_n$ represent the currents of the battery units, $V_1'$-$V_n'$ represent the no-load voltages of the battery units, and n is the number of the battery units.

Therefore, in the step of selecting the battery unit having the greatest remaining power when the battery units are charged (S141), the battery having the least internal resistance is selected. In the step of selecting the battery unit having the least remaining power when the battery units are discharged (S142), the battery having the greater internal resistance is selected.

In the fourth embodiment, the average value of the determining parameters is calculated by the following equation:

$$R_{avg} = \frac{R_1 + R_2 + \ldots + R_n}{n};$$

$R_{avg}$ is an average value of the internal resistances, $R_1$-$R_n$ represent the internal resistances of the battery units which are the determining parameters of the battery units, and n is the number of the battery units.

When the battery units are charged, the setting parameter is calculated by the following equation:

$$K = \left| \frac{(R_{avg} - R_{min}) \times 100}{R_{avg}} \right|;$$

K is the setting parameter and is a positive integer, $R_{min}$ is the power of the battery unit having the least internal resistance, and $R_{avg}$ is the average value.

When the battery units are discharged, the setting parameter is calculated by the following equation:

$$K = \left| \frac{(R_{max} - R_{avg}) \times 100}{R_{avg}} \right|;$$

K is the setting parameter and is a positive integer, $R_{max}$ is the power of the battery unit having the greatest internal resistance, and $R_{avg}$ is the average value.

Figure 6:
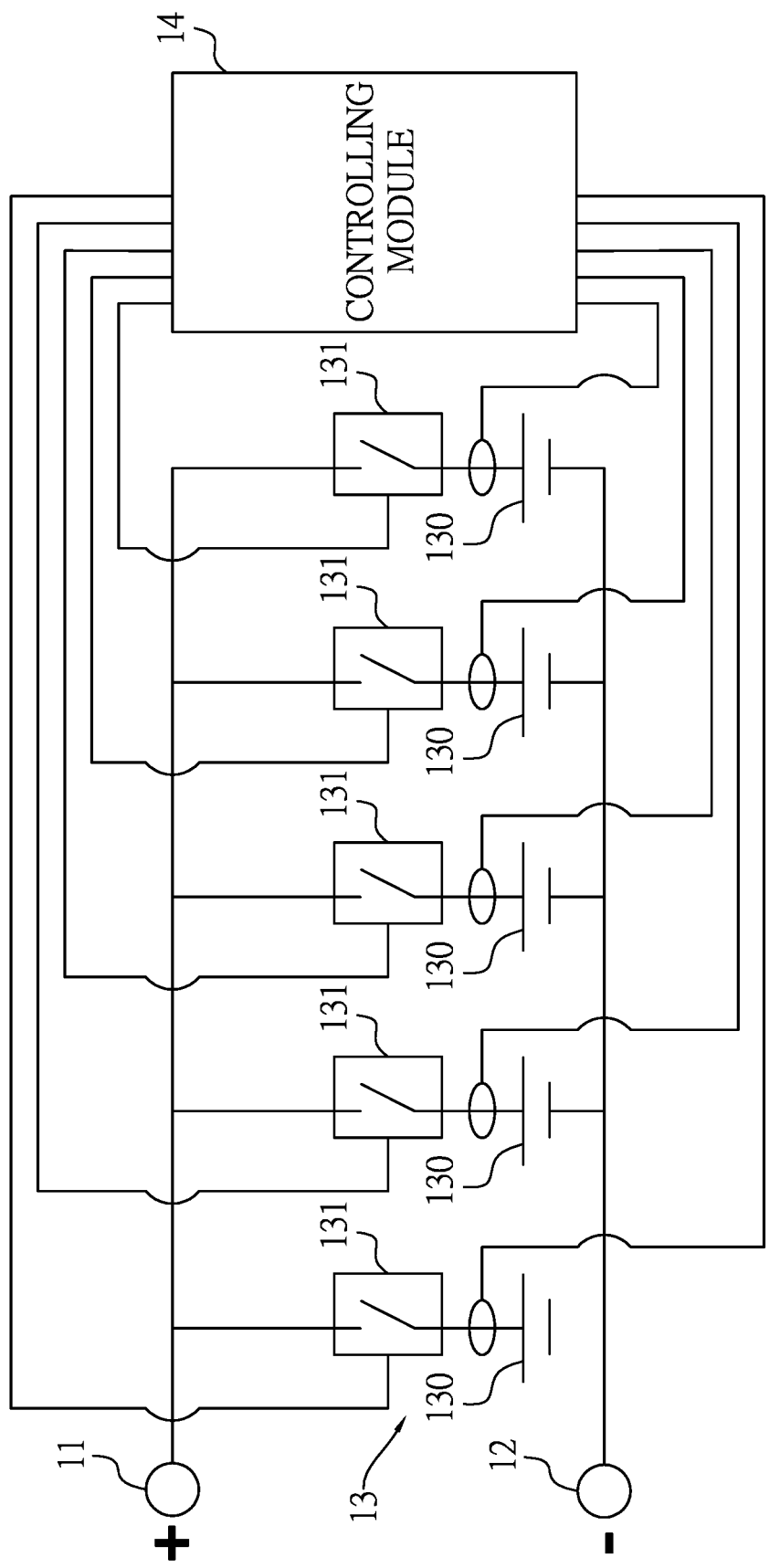
FIG. 6 is a circuit diagram of an embodiment of a control device for equally charging and discharging battery units.

With reference to FIG. 6, the control device 10 for equally charging and discharging battery units comprises a positive electrode 11, a negative electrode 12, a plurality of battery units 13, and a controlling module 14.

The battery units 13 are electronically connected between the positive electrode 11 and the negative electrode 12. Each of the battery units 13 comprises a battery 130 and a first switch 131 electronically connected in series. In the embodiment, the first switch 131 of the battery unit 13 is a relay, an Insulated Gate Bipolar Transistor, or a Metal-Oxide-Semiconductor Field-Effect Transistor.

The controlling module 14 is electronically connected to the first switches 131 and the batteries 130 of the battery units 13. The controlling module 14 detects the battery units 13 to generate measuring parameters of the battery units 13 respectively, calculates determining parameters of the battery units 13 according to the measuring parameters of the battery units 13 respectively, and calculates an average value of the determining parameters of the battery units 13.

The controlling module 14 further selects one of the battery units 13 according to an operating status of the battery units 13, calculates a setting parameter according to the determining parameter of the selected battery unit 13 and the average value of the determining parameters, sets a pause time according to the setting parameter, turns off the first switch 131 of the selected battery unit 13 during the pause time, and turns on the first switch 131 of the selected battery unit 13 after the pause time. The operating status is a charging status or a discharging status.

When the battery units 13 are charged or discharged, the controlling module 14 may select an overcharged or over-discharged battery unit 13. The controlling module 14 may further turn off the first switch 131 of the selected battery unit 13 during the pause time to stop charging or discharging the overcharged or discharged battery unit 13. Therefore, life of the battery units 13 may be prolonged.

Figure 7:
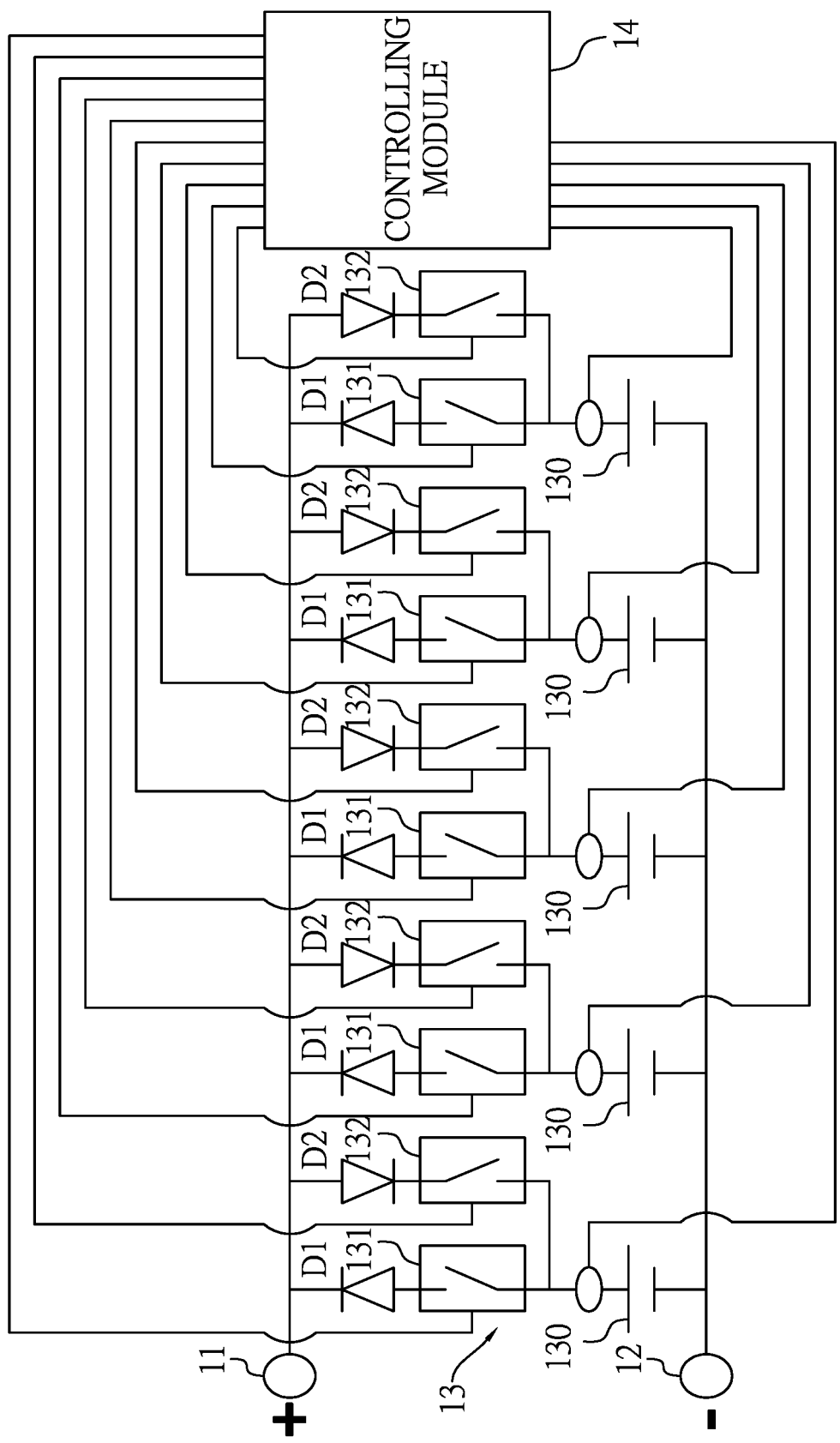
FIG. 7 is a circuit diagram of another embodiment of a control device for equally charging and discharging battery units.

With reference to FIG. 7, each of the battery units 13 further comprises a first high voltage diode D1, a second high voltage diode D2, and a second switch 132.

The first high voltage diode D1 has an anode and a cathode. The cathode of the first high voltage diode D1 is electronically connected to the positive electrode 11, and the anode of the first high voltage diode D1 is electronically connected to the negative electrode 12 through the first switch 131 and the battery 130.

The second high voltage diode D2 has an anode and a cathode. The anode of the second high voltage diode D2 is electronically connected to the positive electrode 11, and the cathode of the second high voltage diode D2 is electronically connected to a node connected by the first switch 131 and the battery 130 through the second switch 132. In the embodiment, the second switch 132 of the battery unit 13 is a relay, an Insulated Gate Bipolar Transistor, or a Metal-Oxide-Semiconductor Field-Effect Transistor.

Therefore, when the battery units 13 are charged, a charging current may flow into the control device 10 through the positive electrode 11. Then, the charging current further flows to the batteries 130 through the second high voltage diodes D2 and the second switches 132. The controlling module 14 may turn off the first switches 131. Further, since the first high voltage diodes D1 are mounted between the positive electrode 11 and the first switches 131, the charging current may not flow through the first switches 131 because of the reverse biases of the first high voltage diodes D1. Therefore, the charging current may not damage the first switches 131.

For the same reason, when the battery units 13 are discharged, a discharging current may flow into the control device 10 through the negative electrode 12. Then, the charging current further flows to the positive electrode 11 through the batteries 130, the first switches 131, and the first high voltage diodes D1. The controlling module 14 may turn off the second switches 132. Further, since the second high voltage diodes D2 are mounted between the positive electrode 11 and the second switches 132, the discharging current may not flow through the second switches 132 because of the reverse biases of the second high voltage diodes D2. Therefore, the discharging current may not damage the second switches 132.

Further, the controlling module 14 may execute the above-mentioned first embodiment to the fourth embodiment of the control method. The controlling module 14 may select one of the battery units 13. The controlling module 14 may further turn on the first switches 131 and turn off the second switches 132 to discharge the battery units 13, and may turn off the first switches 131 and the second switches 132 to stop discharging the battery units 13 during the pause time. Accordingly, the controlling module 14 may turn on the second switches 132 and turn off the first switches 131 to charge the battery units 13, and may turn off the first switches 131 and the second switches 132 to stop charging the battery units 13 during the pause time. Therefore, the battery units 13 may not be overcharged or over-discharged, and life of the battery units 13 may be prolonged.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A control method for equally charging and discharging battery units of a control device, the control method comprising steps of:
   (a) detecting the battery units to generate measuring parameters of the battery units respectively;
   (b) calculating determining parameters of the battery units according to the measuring parameters of the battery units respectively;
   (c) calculating an average value of the determining parameters of the battery units;
   (d) selecting one of the battery units according to an operating status of the battery units, wherein the operating status is a charging status or a discharging status;
   (e) calculating a setting parameter according to the determining parameter of the selected battery unit and the average value of the determining parameters;
   (f) setting a pause time according to the setting parameter;
   (g) stopping charging or discharging the selected battery unit during the pause time; and
   (h) charging or discharging the selected battery unit after the pause time.
   wherein: the step (d) further comprises steps of:
   (d-1) selecting the battery unit having the greatest remaining power when the battery units are charging;
   (d-2) selecting the battery unit having the least remaining power when the battery units are discharging;
   wherein: the measuring parameters of the battery units are voltages of the battery units, and the determining parameters of the battery units are equal to the measuring parameters of the battery units; in step (d-1), the battery having the greatest voltage is selected; in step (d-2), the battery having the least voltage is selected; wherein when the battery units are charged, the setting parameter is calculated by the following equation:

$$K = \left| \frac{(V_{max} - V_{avg}) \times 100}{V_{avg}} \right|$$

where K is the setting parameter and is a positive integer; $V_{max}$ is the voltage of the battery unit having the greatest remaining power; and $V_{avg}$ is the average value; or
   wherein: the measuring parameters of the battery units are voltages of the battery units and currents of the battery units; the determining parameters of the battery units are powers of the battery units; the determining parameters are calculated by the following equation:

$$W_1 = V_1 \times I_1; W_2 = V_2 \times I_2; \ldots W_n = V_n \times I_n$$

where $W_1$–$W_n$ represent the powers of the battery units which are the determining parameters of the battery units; $V_1$–$V_n$ represent the voltages of the battery units; $I_1$–$I_n$ represent the currents of the battery units; and n is the number of the battery units; in step (d-1), the battery having the greatest power is selected; in step (d-2), the battery having the least power is selected; wherein when the battery units are charged, the setting parameter is calculated by the following equation $$K = \left| \frac{(W_{max} - W_{avg}) \times 100}{W_{avg}} \right|;$$

where K is the setting parameter and is a positive integer; $W_{max}$ is the power of the battery unit having the greatest remaining power; and $W_{avg}$ is the average value; or
   wherein: the step (a) further comprises steps of: (a-1) detecting the battery units to generate on-load voltages and currents of the battery units; (a-2) respectively turning off first switches of the battery units to detect the battery units to generate no-load voltages of the battery units; the measuring parameters are the on-load voltages, the currents, and the no-load voltages of the battery units; the determining parameters of the battery units are the internal resistances of the battery units, and the determining parameters are calculated by the following equation:

$$R_1 = \frac{V_1' - V_1}{I_1}; R_1 = \frac{V_2' - V_2}{I_2}; \ldots R_n = \frac{V_n' - V_n}{I_n};$$

where $R_1$–$R_n$ represent the internal resistances of the battery units which are the determining parameters of the battery units; $V_1$–$V_n$ represent the on-load voltages of the battery units; $I_1$–$I_n$ represent the currents of the battery units; $V_1'$–$V_n'$ represent the no-load voltages of the battery units; and n is the number of the battery units; in step (d-1), the battery having the least internal resistance is selected; in step (d-2), the battery having the greatest internal resistance is selected; wherein when the battery units are charged, the setting parameter is calculated by the following equation $$K = \left| \frac{(R_{avg} - R_{min}) \times 100}{R_{avg}} \right|;$$

where K is the setting parameter and is a positive integer; $R_{min}$ is the power of the battery unit having the least internal resistance; and $R_{avg}$ is the average value.

2. The control method as claimed in claim 1, further comprising a step of presetting a multiplying parameter; wherein the pause time is calculated by the following equation:

$$T_{off} = K \times s;$$

where
$T_{off}$ is the pause time;
K is the setting parameter; and
s is the multiplying parameter.

3. The control method as claimed in claim 1, wherein when the battery units are discharged, the setting parameter is calculated by the following equation:

$$K = \left| \frac{(V_{avg} - V_{min}) \times 100}{V_{avg}} \right|$$

where K is the setting parameter and is a positive integer; $V_{max}$ is the voltage of the battery unit having the greatest remaining power; and $V_{avg}$ is the average value.

4. The control method as claimed in claim 1, wherein when the battery units are discharged, the setting parameter is calculated by the following equation:

$$K = \left| \frac{(W_{avg} - W_{min}) \times 100}{W_{avg}} \right|$$

where K is the setting parameter and is a positive integer; $W_{min}$ is the power of the battery unit having the least remaining power; and $W_{avg}$ is the average value.

5. The control method as claimed in claim 1, wherein when the battery units are discharged, the setting parameter is calculated by the following equation:

$$K = \left|\frac{(R_{max} - R_{avg}) \times 100}{R_{avg}}\right|;$$

where K is the setting parameter and is a positive integer; $R_{max}$ is the power of the battery unit having the greatest internal resistance; and $R_{avg}$ is the average value.

6. A control device for equally charging and discharging battery units, comprising:
- a positive electrode;
- a negative electrode;
- a plurality of battery units, electronically connected between the positive electrode and the negative electrode; wherein each of the battery units comprises a battery and a first switch electronically connected to the battery in series;
- a controlling module, electronically connected to the first switches and the batteries; wherein the controlling module detects the battery units to generate measuring parameters of the battery units respectively, calculates determining parameters of the battery units according to the measuring parameters of the battery units respectively, and calculates an average value of the determining parameters of the battery units;
- wherein the controlling module further selects one of the battery units according to an operating status of the battery units, calculates a setting parameter according to the determining parameter of the selected battery unit and the average value of the determining parameters, sets a pause time according to the setting parameter, and turns on the first switch of the selected battery unit after turning off the first switch of the selected battery unit for the pause time;
- wherein the operating status is a charging status or a discharging status.
- wherein: the controlling module selects the battery unit having the greatest remaining power when the battery units are charged; the controlling module selects the battery unit having the least remaining power when the battery units are discharged;
- wherein: the measuring parameters of the battery units are voltages of the battery units, and the determining parameters of the battery units are equal to the measuring parameters of the battery units; the controlling module selects the battery having the greatest voltage as the battery unit having the greatest remaining power; the controlling module selects the battery having the least voltage as the battery unit having the least remaining power; wherein when the battery units are charged, the setting parameter is calculated by the following equation:

$$K = \left|\frac{(V_{max} - V_{avg}) \times 100}{V_{avg}}\right|;$$

where K is the setting parameter and is a positive integer; $V_{max}$ is the voltage of the battery unit having the greatest remaining power; and $V_{avg}$ is the average value; or
wherein: the measuring parameters of the battery units are voltages of the battery units and currents of the battery units; the determining parameters of the battery units are powers of the battery units; the determining parameters are calculated by the following equation:

$$W_1 = V_1 \times I_1; \ W_2 = V_2 \times I_2; \ \ldots \ W_n = V_n \times I_n$$

where $W_1 - W_n$ represent the powers of the battery units which are the determining parameters of the battery units; $V_1 - V_n$ represent the voltages of the battery units; $I_1 - V_n$ represent the currents of the battery units; and n is the number of the battery units; the controlling module selects the battery having the greatest power as the battery unit having the greatest remaining power; the controlling module selects the battery having the least power as the battery unit having the least remaining power; wherein when the battery units are charged, the setting parameter is calculated by the following equation $$K = \left|\frac{(W_{max} - W_{avg}) \times 100}{W_{avg}}\right|;$$

where K is the setting parameter and is a positive integer; $W_{max}$ is the power of the battery unit having the greatest remaining power; and $W_{avg}$ is the average value; or
wherein: the controlling module further detects the battery units to generate on-load voltages and currents of the battery units, and respectively turns off the first switches of the battery units to detect the battery units to generate no-load voltages of the battery units; the measuring parameters are the on-load voltages, the currents, and the no-load voltages of the battery units; the determining parameters of the battery units are the internal resistances of the battery units, and the determining parameters are calculated by the following equation:

$$R_1 = \frac{V'_1 - V_1}{I_1}; \ R_1 = \frac{V'_2 - V_2}{I_2}; \ \ldots \ R_n = \frac{V'_n - V_n}{I_n};$$

where $R_1 -$ represent the internal resistances of the battery units which are the determining parameters of the battery units; $V_1 - V_n$ represent the on-load voltages of the battery units; $I_1 - I_n$ represent the currents of the battery units; $V_1' - V_n'$ represent the no-load voltages of the battery units; and n is the number of the battery units; the controlling module selects the battery having the least internal resistance as the battery unit having the greatest remaining power; the controlling module selects the battery having the greatest internal resistance as the battery unit having the least remaining power; wherein when the battery units are charged, the setting parameter is calculated by the following equation $$K = \left|\frac{(R_{avg} - R_{min}) \times 100}{R_{avg}}\right|;$$

where K is the setting parameter and is a positive integer; $R_{min}$ is the power of the battery unit having the least internal resistance; and $R_{avg}$ is the average value.

7. The control device as claimed in claim 6, wherein each of the battery units further comprises:
   a first high voltage diode, having an anode and a cathode; wherein the cathode of the first high voltage diode is electronically connected to the positive electrode, and the anode of the first high voltage diode is electronically connected to the negative electrode through the first switch and the battery;
   a second switch;
   a second high voltage diode, having an anode and a cathode; wherein the anode of the second high voltage diode is electronically connected to the positive electrode, and the cathode of the second high voltage diode is electronically connected to the second switch through which the second high voltage diode can be electronically connected to the first switch and the battery.

8. The control device as claimed in claim 7, wherein the first switches and the second switches are relays, Insulated Gate Bipolar Transistors, or Metal-Oxide-Semiconductor Field-Effect Transistors.

9. The control device as claimed in claim 6, wherein the controlling module further presets a multiplying parameter, and the pause time is calculated by the following equation:

$$T_{off} = K \times s;$$

where
   $T_{off}$ is the pause time;
   K is the setting parameter; and
   s is the multiplying parameter.

10. The control device as claimed in claim 6, wherein when the battery units are discharged, the setting parameter is calculated by the following equation:

$$K = \left| \frac{(V_{avg} - V_{min}) \times 100}{V_{avg}} \right|$$

where K is the setting parameter and is a positive integer; $V_{max}$ is the voltage of the battery unit having the greatest remaining power; and $V_{avg}$ is the average value.

11. The control device as claimed in claim 6, wherein when the battery units are discharged, the setting parameter is calculated by the following equation:

$$K = \left| \frac{(W_{avg} - W_{min}) \times 100}{W_{avg}} \right|;$$

where K is the setting parameter and is a positive integer; $W_{min}$ is the power of the battery unit having the least remaining power; and $W_{avg}$ is the average value.

12. The control device as claimed in claim 6, wherein when the battery units are discharged, the setting parameter is calculated by the following equation:

$$K = \left| \frac{(R_{max} - R_{avg}) \times 100}{R_{avg}} \right|;$$

where K is the setting parameter and is a positive integer; $R_{max}$ is the power of the battery unit having the greatest internal resistance; and $R_{avg}$ is the average value.

* * * * *